(12) United States Patent
Naeini et al.

(10) Patent No.: US 9,510,369 B2
(45) Date of Patent: Nov. 29, 2016

(54) SENSING AND/OR TRANSMISSION COVERAGE ADAPTATION USING INTERFERENCE INFORMATION

(71) Applicant: Nokia Corporation, Espoo (FI)

(72) Inventors: Hossein Ali Safavi Naeini, Schereville, IN (US); Chittabrata Ghosh, Fremont, CA (US); Klaus Franz Doppler, Albany, CA (US); Sayantan Choudhury, Berkeley, CA (US); Sumit Roy, Seattle, WA (US)

(73) Assignee: Nokia Technologies Oy, Espoo (FI)

( * ) Notice: Subject to any disclaimer, the term of this patent is extended or adjusted under 35 U.S.C. 154(b) by 108 days.

(21) Appl. No.: 14/338,019

(22) Filed: Jul. 22, 2014

(65) Prior Publication Data

US 2016/0029412 A1    Jan. 28, 2016

(51) Int. Cl.

| | |
|---|---|
| *H04W 74/08* | (2009.01) |
| *H04W 72/08* | (2009.01) |
| *H04W 52/24* | (2009.01) |
| *H04W 88/08* | (2009.01) |
| *H04B 1/00* | (2006.01) |
| *H04B 15/00* | (2006.01) |
| *H04W 52/34* | (2009.01) |
| *H04W 52/38* | (2009.01) |

(52) U.S. Cl.
CPC ....... *H04W 74/0808* (2013.01); *H04W 52/244* (2013.01); *H04W 72/082* (2013.01); *H04B 1/00* (2013.01); *H04B 15/00* (2013.01); *H04W 52/343* (2013.01); *H04W 52/38* (2013.01); *H04W 88/08* (2013.01)

(58) Field of Classification Search
CPC ......... H04W 74/0808; H04W 72/082; H04W 88/08
See application file for complete search history.

(56) References Cited

U.S. PATENT DOCUMENTS

| | | | |
|---|---|---|---|
| 2007/0104139 A1 | 5/2007 | Marinier et al. | |
| 2007/0242621 A1 | 10/2007 | Nandagopalan et al. | |
| 2009/0086843 A1 | 4/2009 | Li | |
| 2013/0017794 A1 | 1/2013 | Kloper et al. | |
| 2015/0245364 A1* | 8/2015 | Yacovitch | H04W 16/10 370/329 |
| 2015/0281993 A1* | 10/2015 | Chen | H04W 24/10 370/338 |
| 2015/0319700 A1* | 11/2015 | Oteri | H04W 52/10 455/127.1 |

FOREIGN PATENT DOCUMENTS

| | | |
|---|---|---|
| JP | 2007166373 A | 6/2007 |
| WO | WO-2008031059 A1 | 3/2008 |
| WO | WO-2014077746 A1 | 5/2014 |

* cited by examiner

*Primary Examiner* — Jae Y Lee
(74) *Attorney, Agent, or Firm* — Mintz Levin Cohn Ferris Glovsky and Popeo, P.C.

(57) ABSTRACT

Methods and apparatus, including computer program products, are provided for sensing and/or transmission coverage adaptation using interference information. In one aspect there is provided a method. The method may include determining, at a node, a degree of interference at the node; receiving, at the node, at least one message from at least one neighboring node, the at least one message including another degree of interference observed at the at least one neighboring node; and adjusting, by the node based on the degree of interference at the node and the at least another degree of interference, at least one of a receiver sensitivity of the node, a clear channel assessment detection range of the node, or a transmit power of the node. Related apparatus, systems, methods, and articles are also described.

19 Claims, 9 Drawing Sheets

CASE 1

PARTIAL INTERFERENCE GRAPH

CASE 2

PARTIAL INTERFERENCE GRAPH

CASE 3

PARTIAL INTERFERENCE GRAPH

| TA | RA | EXISTING ELEMENTS | INTERFERENCE DEGREE | PERIOD 1 DURATION | PERIOD 2 DURATION |
|---|---|---|---|---|---|
|  |  |  | 702 | 704 | 706 |

FIG. 7

SENSING AND/OR TRANSMISSION COVERAGE ADAPTATION USING INTERFERENCE INFORMATION

FIELD

The subject matter described herein relates to wireless communications.

BACKGROUND

Wireless devices may access a network based on a carrier sense multiple access (CSMA) protocol in order to avoid simultaneous transmission among neighboring nodes and interference. To that end, a wireless device may listen on a given channel. If the channel is clear, the wireless device may transmit on that channel. But if the channel is being used by another wireless device, the wireless device backs off and waits a certain amount of time (which in some cases can be a random amount of time) before listening and trying to transmit on the channel again.

SUMMARY

Methods and apparatus, including computer program products, are provided for sensing and/or transmission coverage adaptation using interference information.

In some example embodiments, there is a method. The method may include determining, at a node, a degree of interference at the node; receiving, at the node, at least one message from at least one neighboring node, the at least one message including another degree of interference observed at the at least one neighboring node; and adjusting, by the node based on the degree of interference at the node and the at least another degree of interference, at least one of a receiver sensitivity of the node, a clear channel assessment detection range of the node, or a transmit power of the node.

In some variations, one or more of the features disclosed herein including the following features can optionally be included in any feasible combination. The adjusting may determine a difference between the degree of interference at the node and the at least another degree of interference of the at least one neighboring node, and the adjusting, based on the difference, at least one of the receiver sensitivity of the node or the clear channel assessment detection range of the node. The determining may listen to at least one beacon transmitted by the at least one neighboring node. An aggregate may be determined for the at least another degree of interference, wherein the adjusting is based on the aggregate of at least one of the receiver sensitivity of the node, the clear channel assessment detection range of the node, or the transmit power of the node, wherein the at least another degree of interference comprises degree of interference values for at least two neighboring nodes. The aggregate may include at least one of a median, a mode, a second order statistic, or a weighted average. The method may further include adjusting, for a first time period, the clear channel assessment detection range of the node to a first range; and adjusting, for a second time period, the clear channel assessment detection range of the node to a second range. The adjusting may include increasing the clear channel assessment detection range of the node to increase the degree of interference of the node. The adjusting may include decreasing the clear channel assessment detection range of the node to decrease the degree of interference of the node. The node may include an access point.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 7 illustrates an example frame structure including information elements carried by a beacon, in accordance with some example embodiments;

Figure 1:
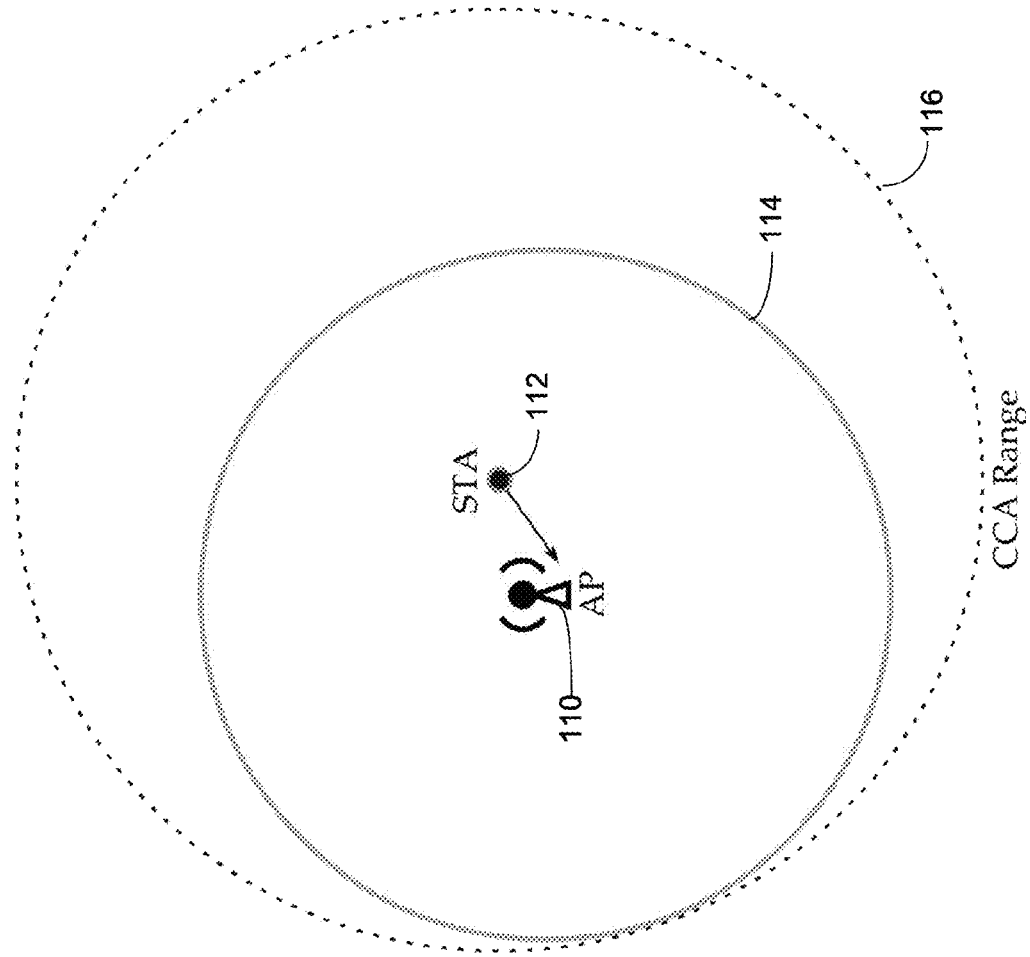
FIG. 1 illustrates a node, such as a Wi-Fi station (STA), and its corresponding clear channel assessment range, in accordance with some example embodiments.

Like labels are used to refer to same or similar items in the drawings.

DETAILED DESCRIPTION

Wi-Fi devices, such as a station (STA), may access a network based on a carrier sense multiple access (CSMA) protocol in order to avoid simultaneous transmission among neighboring nodes and interference. To that end, a Wi-Fi device may operate its receiver to have a certain clear channel assessment (CCA) detection range that covers the basic service set (BSS) of the neighboring Wi-Fi devices being served by the Wi-Fi device. As such, the Wi-Fi device's receiver may make a clear channel assessment by listening for neighboring devices before transmitting on a given channel.

Wi-Fi networks are evolving into so-called "High Efficiency Wireless Local Area Networks" (HEW), in which W-Fi operation may operate at greater speeds (for example, 10 Gigabits per second or more) and in higher density environments. The Wi-Fi carrier sense multiple access (CSMA) protocol relies on listening to transmissions as a way to avoid simultaneous transmissions and interference. Before transmitting data, a node, such as a station (STA) or an access point (AP), may listen for activity on a channel and may begin sending data when the node determines, based on the listening, that other nodes are idle (for example, not actively transmitting on the channel). The node's receiver may be sufficiently sensitive to detect most transmissions in the basic service set (BSS).

FIG. 1 depicts a node, such as STA 112, communicating via Wi-Fi to another node, such as an access point (AP) 110. The clear channel assessment (CCA) detection range 116 covers the basic service set (BSS) of the entire area 114 being served by access point 110. Tuning the CCA detection range 116 may affect the performance of Wi-Fi as it is likely that nodes from adjacent networks (for example, overlapping basic service set, OBSS, nodes) may trigger the CCA avoidance mechanism as depicted at FIG. 2.

Figure 2:
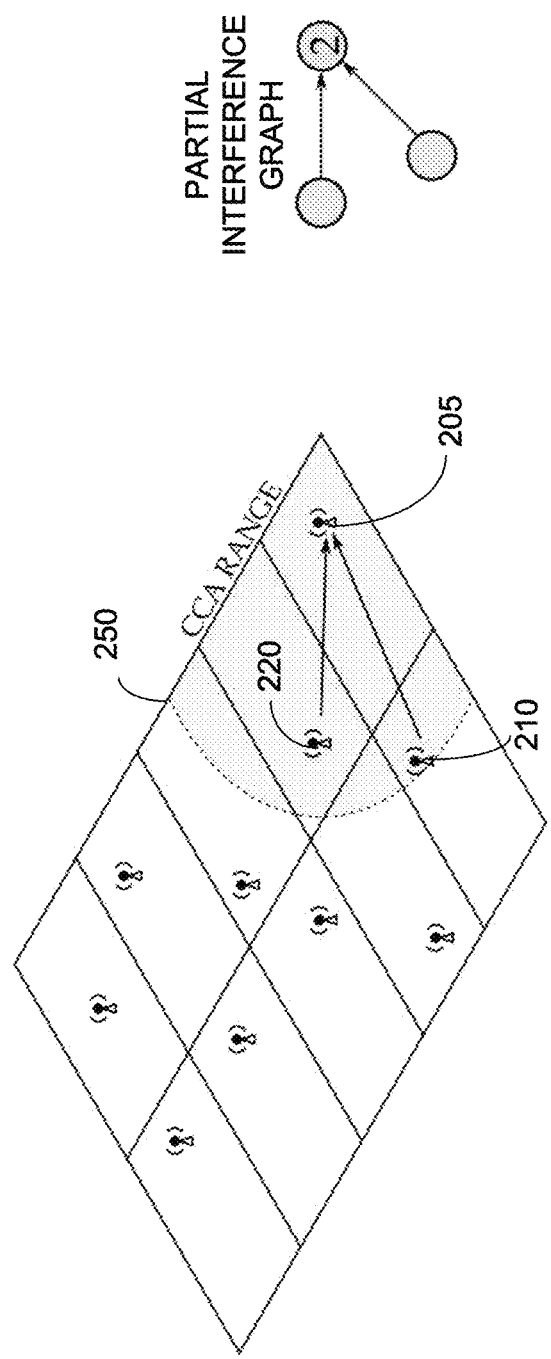
FIG. 2 illustrates a Wi-Fi station, such as an access point (AP), and its corresponding partial interference graph depicting a contention domain or interference degree of 2, in accordance with some example embodiments.

FIG. 2 depicts a node 205 having a relatively small CCA range 250 including two other nodes 210 and 220. Tuning the CCA range 250 of node 205 may thus change the size of the CCA area 250 (or range) to include more (or fewer) other nodes in the CCA area.

FIG. 2 also depicts a partial interference graph including the two potential interferers, such as nodes 210 and 220. From the point of view of node 205, the contention domain of the clear channel assessment may be a set of neighboring nodes to node 205, and these neighboring nodes may have sufficient transmit power to trigger a CCA channel access deferral at node 205. For example, nodes 210 and 220 may have a received signal power, as measured at node 205, that is greater than a receiver sensitivity threshold of about −82 dBm (milliwatts), although other power threshold values may be used as well. In the example of FIG. 2, the contention domain of neighboring nodes 210 and 220 may represent an interference degree of 2 as shown by the partial interference graph. In the current 802.11 standard, the CCA threshold is fixed for each node.

Figure 3:
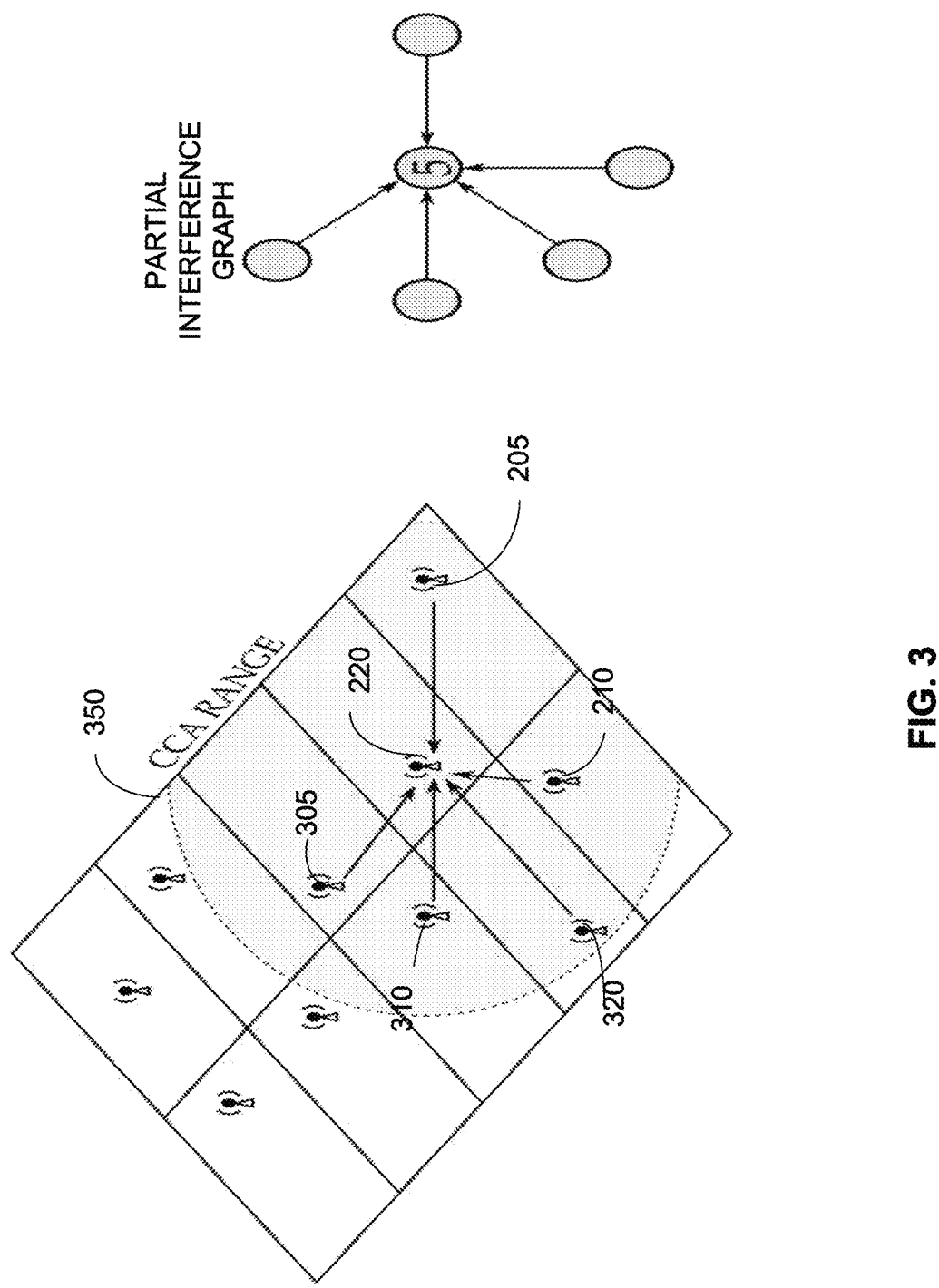
FIG. 3 illustrates another example of a Wi-Fi station, such as an access point (AP), and its corresponding partial interference graph depicting a contention domain or interference degree of 5, in accordance with some example embodiments.

However in dense networks, such as HEW deployment environments, the contention domain for each node may be varied based on the topology of the network deployment. For example, Wi-Fi networks deployed in the center of an apartment or office building may experience more contention than Wi-Fi networks deployed at the edge or periphery of the building. As such, these networks having higher interference degrees or contention may receive a proportionally smaller amount of channel access time, when compared to less densely deployed networks. As such, the networks having higher interference degrees or contention and the corresponding proportionally smaller amount of channel access time may result in a degree of unfairness for those networks. This is illustrated in FIGS. 2 and 3. FIG. 3 also depicts node 205 with a different CCA range and thus a different degree of interference, when compared to FIG. 2. In FIG. 2, the node 205 contends for access with only 2 other nodes, while in FIG. 3 the contention domain is larger (for example, includes five nodes 210, 220, 305, 310, and 320 within the CCA range 350). As such, there may be a fundamental contention domain unfairness for node 205 in FIG. 3, when compared to node 205 in FIG. 2.

In some example embodiments, the subject matter disclosed herein may provide mitigation of contention domain unfairness in a distributed way, and the mitigation may be implemented with a minimal amount of signaling and/or in a distributed manner with little (or no) centralized control.

In some example embodiments, there may be provided partial interference graphs as a measure of contention or degree of interference. In some example embodiments, a process may be provided to infer the partial interference graph based on detected (for example, received, listened to, overheard, and/or the like) frames carried via Wi-Fi beacons.

In some example embodiments, a process may affect channel access fairness by modifying CCA range, receiver sensitivity thresholds, and/or transmitter power. The modification may be based on determined degree of interference (or contention degree) and/or partial interference graphs from adjacent/neighboring nodes.

In some example embodiments, a process for periodic expansion and/or contraction of a receiver's sensitivity and CCA range/threshold may be implemented to minimize channel access deferrals.

In some example embodiments, there may be provided improved channel access probability for nodes that are in high contention domains at the cost of reduced channel access at nodes with smaller contention domains. In short, a relatively fairer scheme for accessing the channel in high-density scenarios may be provided.

Although some of the examples herein refer to Wi-Fi and HEW, the subject matter disclosed herein may be used in other wireless systems as well. Moreover, although some of the examples refer to Wi-Fi nodes, such as STAs and APs, the devices may be implemented as for example multi-mode radios, such as a cellular user equipment including a Wi-Fi radio as well as other radio technologies.

The following examples illustrate various types of Wi-Fi/HEW network topologies. In the following example networks, each of the networks may have a fixed contention domain threshold (CCA threshold) and/or may have a local partial interference graph depicted. Some networks may contend with only a few other nodes/networks (see, for example, case 2 at FIG. 4A) while others may contend with more nodes/networks (see, for example, cases 1 and 3 at FIG. 4A). As a result, the node/networks contending with fewer other nodes/networks may access the channel for a correspondingly larger period of time, which represents unfairness when compared to networks having more contention.

In some example embodiments, an AP's rseceiver sensitivity may remain in a range sufficient to decode signals from all STAs associated to the AP. The AP's receiver sensitivity value may be set dynamically based on for example a minimum received signal strength from among the list of STAs associated with the AP. Moreover, there may be a minimum (or floor) receiver sensitivity threshold. This receiver sensitivity threshold value may be specified. Furthermore, the AP's transmit power may be adjusted, so that transmit power is sufficient to enable decoding of a downlink frame at the associated STA(s).

In some example embodiments, an access point may record the identity of beacons detected from other access points (and/or STAs in overlapping basic service sets). Next, the AP may count the number of the detected access points to derive its own interference degree (or contention domain). The access point may then advertise its own interference degree using its beacon so that other access points are aware of the interference degree. The access point may then determine a difference between its own interference degree and the interference degree of one or more surrounding networks (which also advertise in their beacons their interference degree). Based on the determined difference, the AP may then adapt (for example, maintain, increase, and/or decrease) its receiver sensitivity and/or CCA range. For example, if neighboring interference degrees are larger on average, the AP may increase its CCA range (or decrease its receiver sensitivity threshold so that it detects weaker signals) to capture more networks. However, if neighboring interference degrees are smaller on average, the AP may reduce its CCA range (or increase its receiver sensitivity threshold so that it is less able to detect weaker signals). Alternatively or additionally, the AP may fix the receiver sensitivity and adjust AP transmit power based on the number of overlapping basis service set.

Figure 4A:
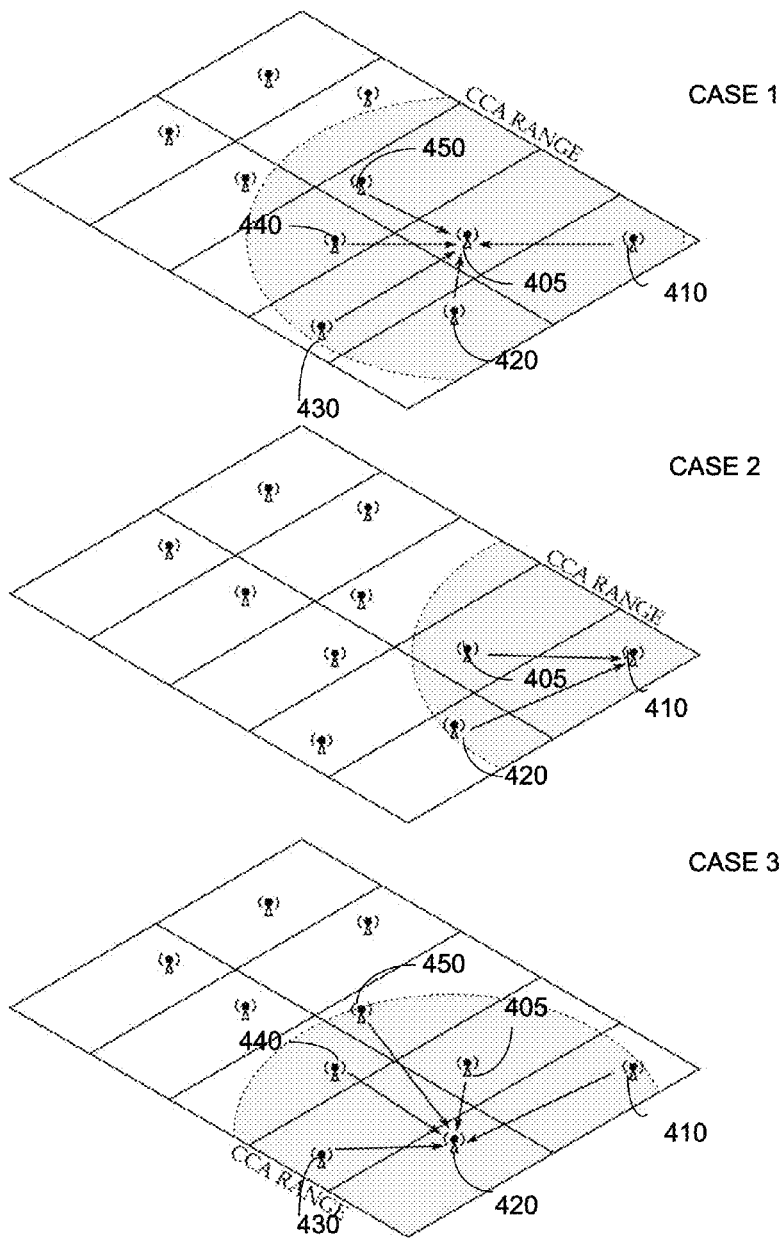
FIG. 4A illustrates the imbalance in the size of contention domains, in accordance with some example embodiments.
Figure 4A:
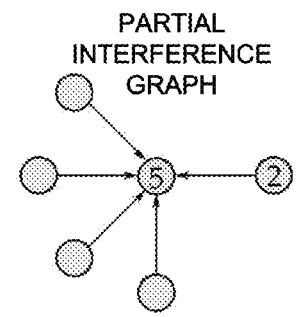
Figure 4A:
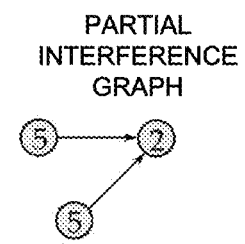
Figure 4A:
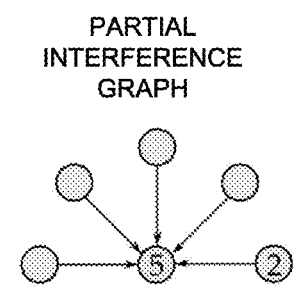

FIG. 4A depicts an access point informing neighboring access points of the interference degree or contention domain, in accordance with some example embodiments. For example, access point 405 may send an interference degree of 5; access point 410 may send to nodes 405 and 420 an interference degree of 2, while access point 420 may send to nodes 405, 410, and 430-450 and interference degree of 5. Each access point at FIG. 4A may record the identity of detected beacons from other neighboring access points. For example, AP 410 may record the identity of detected beacons for access points 405 and 420. Next, access points 410 may count the number of the detected access points to derive its own interference degree. In this example, the interference degree for access point 410 is 2. Access point 410 may then advertise the interference degree via for example its beacon, so that other, neighboring access points are aware of the interference degree. Access point 410 may also receive via the beacons of access point 405 and 420 the interference degrees of access points 405 and 420. In this example, access points 405 and 420 each have an interference degree of 5. AP 410 may determine the difference between its interference degree and those of surrounding network. In this example, access point 410 may determine a difference of 3 (i.e., an average neighboring node interference degree of 5 minus 2). Although an average of the interference degrees is described in the previous example, the interference degrees from one or more neighbor nodes may be combined in other ways as well (for example, a median, a mode, 2nd order statistics such as standard deviation, a weighted average based on how close the neighboring node is, and the like).

Based on the determined difference, access point 410 may adapt (for example, maintain, increase, and/or decrease) one or more thresholds, such as a receiver sensitivity threshold affecting CCA range. In this example, neighboring nodes 405 and 420 have interference degrees that are on average larger than the interference degree of access point 410. When this is the case, access point 410 may increase its CCA range (for example, by making its receiver more sensitivity by decreasing its receiver sensitivity threshold so it captures weaker and thus potentially more access points). In addition and/or alternatively, the interference degree information can be used to reduce transmit power at the access point 410 in order to limit contention with neighboring nodes in the basic service set. Moreover, the access point may, as noted, adhere to floor and/or cap (e.g., a minimum and/or a maximum) values for CCA range, receiver sensitivity, and/or transmit power.

Figure 4B:
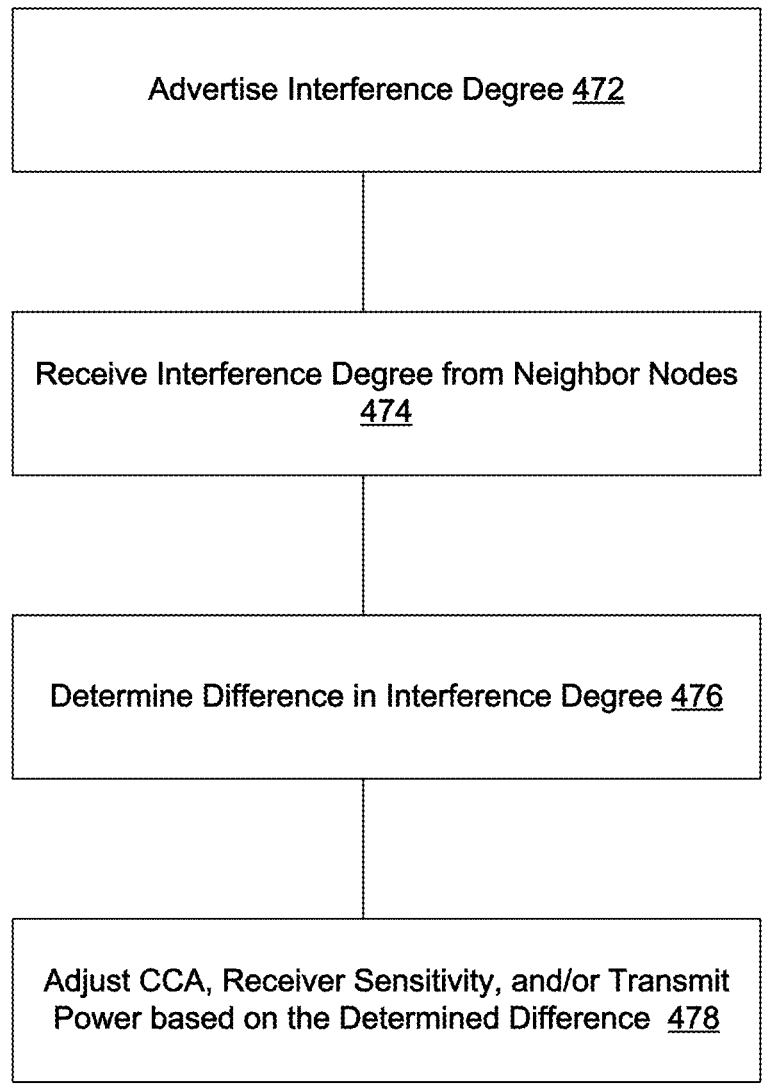
FIG. 4B illustrates an example of a process for adjusting clear channel assessment range, receiver sensitivity, and/or transmit power, in accordance with some example embodiments.

FIG. 4B depicts an example process 400 for adjusting, based in interference degree, CCA range, receiver sensitivity, and/or transmit power, in accordance with some example embodiments. The description of FIG. 4A also refers to FIG. 4A.

At 472, a node, such as access point 410, may advertise it interference degree, in accordance with some example embodiments. For example, access point 410 may detect neighboring nodes based on beacons received/detected by the access point 410. For example, neighboring access points, such as access points 405 and 420 may each transmit a beacon, which may be detected by access point 410. The access point 410 may then determine the contention domain for the CCA area given its current receiver sensitivity. For example, access point 410 may determine its contention domain (or interference degree) as 2. Access point 410 may then advertise the determined interference degree of 2 to its neighboring nodes via for example a beacon, which may be configured as described with respect to FIG. 7 below. Each of the other nodes, such as nodes 405 and 420, may also determine an interference degree and then advertise via a beacon the determined interference degree to its neighboring nodes.

At 474, a node, such as access point 410, may receive the interference degree from one or more neighboring nodes, in accordance with some example embodiments. For example, access point 410 may receive the beacons from neighboring access points 405 and 420. The access point 410 may determine an aggregate value, in some example embodiments, representative of the interference degree of the neighboring nodes 405 and 420. For example, the aggregate value may be an average of the interference degrees of each of the neighbors, although the aggregate may be determined in other ways (such as determining a median interference degree among the neighbors, selecting a maximum interference degree from among the neighbors, determining a median, determining a mode, determining 2nd order statistics, a weighted average based on how close the neighboring node is, and/or the like).

At 476, a node, such as access point 410, may determine a difference between its interference degree and the aggregate interference degrees of the neighboring nodes, in accordance with some example embodiments. For example, access point 410 may determine a difference of 3, which represents the difference between access points's 410 interference degree (2) and the aggregate interference degree (5) of neighboring nodes 405 and 420.

At 478, a node, such as access point 410, may adjust CCA range, receiver sensitivity, and/or transmit power in accordance with some example embodiments. For example, access point 410 may adapt, based on the difference between its interference degree and that of its neighbors, one or more thresholds, such as a receiver sensitivity threshold affecting CCA range. In the example of FIG. 4A, neighboring nodes 405 and 420 have interference degrees that are on average larger than the interference degree of access point 410, so access point 410 may increase its CCA range (for example, by decreasing a sensitivity threshold at the receiver) to capture more access points and thus making access point's 410 degree of interference more comparable to its neighbors. This may provide an overall improvement in channel access probability for the neighboring nodes (which are in a higher contention domain) at the cost of reduced channel access for node 410 (which prior to the adjustment at 478 had a smaller contention domain).

Figure 5:
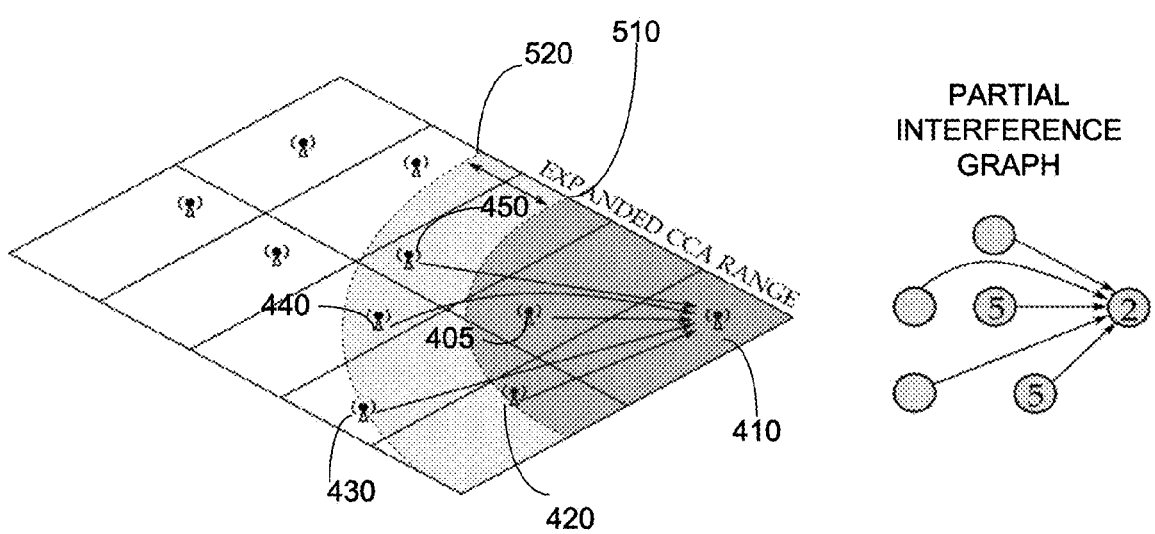
FIG. 5 illustrates the effect of clear channel assessment range (or receiver sensitivity) changes, in accordance with some example embodiments.

FIG. 5 depicts the second case depicted at FIG. 4 but in the example of FIG. 5, access point 410 may expand, based on the interference degree, its CCA range from 510 to 520 so that its interference degree is more balanced with respect to its neighbors.

Although the previous example was described with respect to access point 410, the process 400 may be distributed among one or more access points, so that one or more other access points may implement process 400 and adjust CCA range, receiver sensitivity, and/or transmit power in accordance with some example embodiments.

Figure 6:
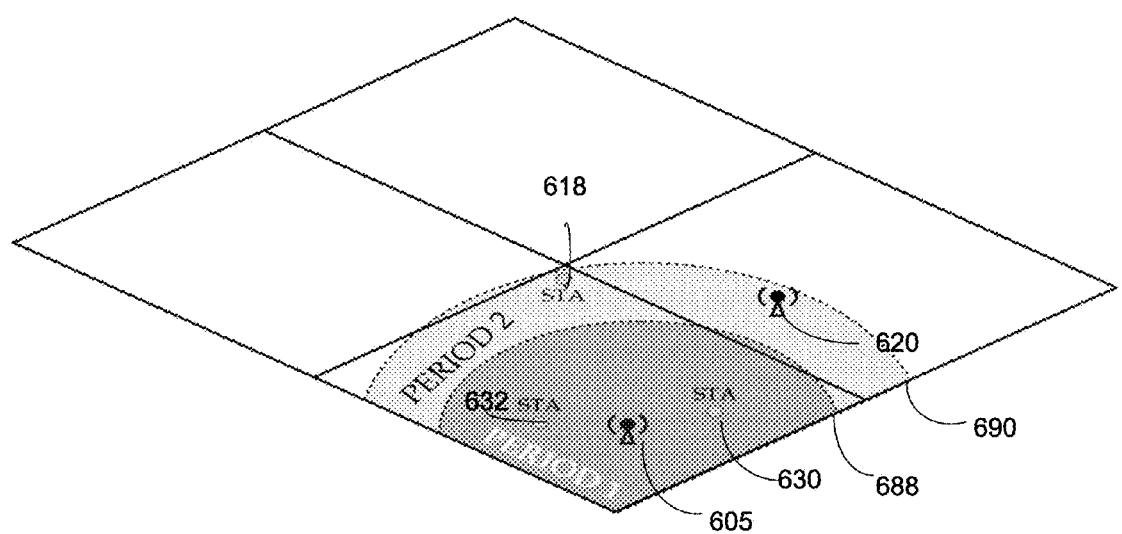
FIG. 6 illustrates an example of periodic range adjustment, in accordance with some example embodiments.

FIG. 6 depicts access point 605 during a first time period having a first CCA range and during a second time period having a second CCA range, in accordance with some example embodiments. In some instances, it may be difficult to determine a contention reduction without changes to the receiver sensitivity that takes the sensitivity outside of the minimum threshold or maximum threshold noted above. As noted, the minimum (or floor) receiver sensitivity threshold may be set at an access point, so the access point cannot reduce its receiver sensitivity threshold below this minimum signal strength (so the access point can serve the weakest/farthest STA associated to it). When the floor/minimum is used, the access point may be configured to serve edge nodes from time to time (for example, periodically) in the interest of overall fairness and performance. In the example of FIG. 6, access point 605 may, during the first period, operate using a receiver sensitivity that is low enough that access point 605 will not detect (or will ignore) one or more edge STAs 618-620. During the second period, access point 605 may adjust its receiver sensitivity to serve all nodes 630, 632, 618, and 620.

In the example of FIG. 6, the two time periods with different receiver sensitivities may allow better frequency reuse for a larger portion of time while maintaining service to edge nodes in the basic service set (BSS). Indeed, the periodic expansion/contraction can be employed to shrink the number of overheard basic service set to zero in some cases. The information regarding start/end of each such period may be provided through the access point beacon. If a STA is not covered during the first period, the STA may wait until the second period to transmit any packets to access point 605.

To inform neighboring access points of the interference degree and/or inform nodes of the periodicity of range expansion/contraction, one or more information elements may are added to the Wi-Fi beacon, although the information may be signaled in other ways as well.

FIG. 7 depicts an example of a structure for the information elements carried by a beacon including the extensions for interference degree 702, first time period 704, and/or the second time period 706. The interference degree 702 may be represented using for example a fixed number of bits capped at a certain level (for example, maximum interference degree can be 15 with 4 bits) and the periodicity 704-708 can be expressed in multiples of a time unit (for example, milliseconds) with a fixed number of bits. The additional fields 702-706 in the beacon may be sufficient to inform neighboring APs of local interference/contention conditions as well as inform the nodes of relevant sensitivity periods.

Figure 8:
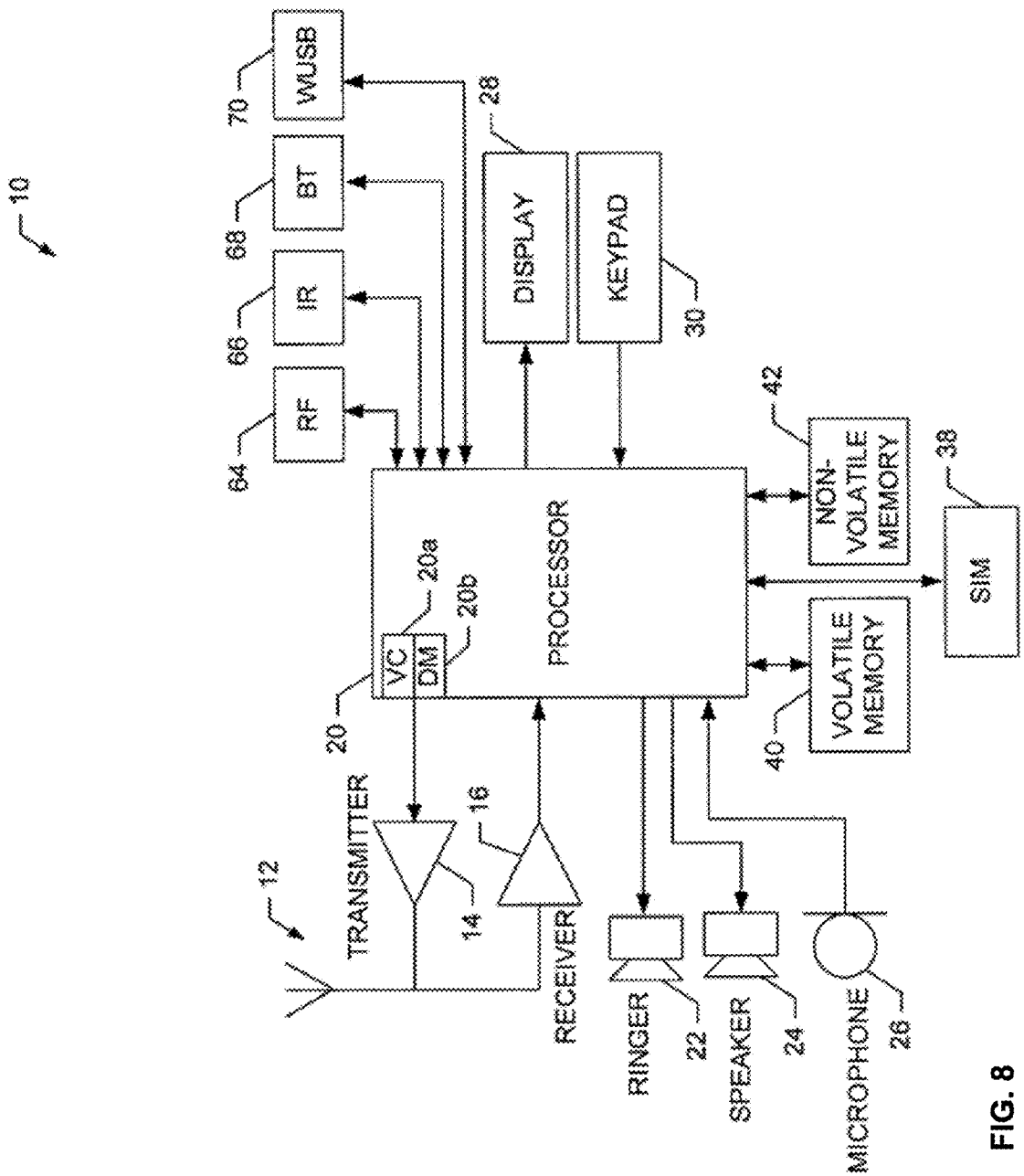
FIG. 8 depicts an example of an apparatus, in accordance with some exemplary embodiments.

FIG. 8 illustrates a block diagram of an apparatus 10, in accordance with some example embodiments. The apparatus 10 (or portions thereof) may be configured to provide a STA, such as an access point, node, user equipment, and/or the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 8 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 8, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 400 and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 400 including for example advertising degree of interference, the first time period of a first CCA range, and/or the second time period of a second CCA range, receiving neighboring node interference degrees, determining differences in interference degrees, and/or adjusting CCA range, receiver sensitivity, and/or transmit power based on the interference degrees (for example, the difference between an access point's interference degree and the interference degrees of its neighboring nodes).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 8, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be improved frequency re-use and/or fairness for high density deployments.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   determining, at a node, a degree of interference at the node;
   receiving, at the node, at least one message from at least one neighboring node, the at least one message including another degree of interference observed at a first neighboring node of the at least one neighboring node;
   determining, at the node, a difference between the degree of interference at the node and the received another degree of interference; and
   adjusting, by the node and based on the difference, at least one of a receiver sensitivity of the node and a clear channel assessment detection range of the node.

2. The method of claim 1, wherein the adjusting further comprises:
   adjusting, based on the difference, a transmit power of the node.

3. The method of claim 1, wherein the receiving comprises listening to at least one beacon transmitted by the at least one neighboring node.

4. The method of claim 1, further comprising:
   determining an aggregate for the another degree of interference and one or more additional degrees of interference; and
   adjusting, based on the aggregate, at least one of the receiver sensitivity of the node, the clear channel assessment detection range of the node, and a transmit power of the node, wherein the one or more additional degrees of interference are observed at one or more neighboring nodes of the at least one neighboring node other than the first neighboring node.

5. The method of claim 4, wherein determining the aggregate comprises determining at least one of a median, a mode, a second order statistic, or a weighted average.

6. The method of claim 1 further comprising:
   adjusting, for a first time period, the clear channel assessment detection range of the node to a first range; and
   adjusting, for a second time period, the clear channel assessment detection range of the node to a second range that is different from the first range.

7. The method of claim 1, wherein the adjusting comprises increasing the clear channel assessment detection range of the node to increase the degree of interference at the node.

8. The method of claim 1, wherein the adjusting comprises decreasing the clear channel assessment detection range of the node to decrease the degree of interference at the node.

9. The method of claim 1, wherein the node comprises an access point.

10. An apparatus comprising:
    at least one processor; and
    at least one memory including computer program code, the at least one memory and the computer program code configured to, with the at least one processor, cause the apparatus to at least:
       determine, at the apparatus, a degree of interference at the apparatus;
       receive, at the apparatus, at least one message from at least one neighboring node, the at least one message including another degree of interference observed at a first neighboring node of the at least one neighboring node;
       determine, at the apparatus, a difference between the degree of interference at the apparatus and the received another degree of interference; and
       adjust, by the apparatus and based on the difference, at least one of a receiver sensitivity of the apparatus and a clear channel assessment detection range of the apparatus.

11. The apparatus of claim 10, wherein the apparatus is further configured to at least:
    adjust, based on the difference, a transmit power of the apparatus.

12. The apparatus of claim 10, wherein the apparatus is further configured to at least:
    listen to at least one beacon transmitted by the at least one neighboring node.

13. The apparatus of claim 10, wherein the apparatus is further configured to at least:
    determine an aggregate for the at least another degree of interference and one or more additional degrees of interference; and
    adjust, based on the aggregate, at least one of the receiver sensitivity of the apparatus, the clear channel assessment detection range of the apparatus, and a transmit power of the apparatus, wherein the one or more additional degrees of interference are observed at one or more neighboring nodes of the at least one neighboring node other than the first neighboring node.

14. The apparatus of claim 13, wherein the apparatus is further configured to at least:
determine at least one of a median, a mode, a second order statistic, or a weighted average.

15. The apparatus of claim 10, wherein the apparatus is further configured to at least:
adjust, for a first time period, the clear channel assessment detection range of the apparatus to a first range; and
adjust, for a second time period, the clear channel assessment detection range of the apparatus to a second range that is different from the first range.

16. The apparatus of claim 10, wherein the apparatus is further configured to at least adjust by at least increase the clear channel assessment detection range of the apparatus to increase the degree of interference at the apparatus.

17. The apparatus of claim 10, wherein the apparatus is further configured to at least adjust by at least decrease the clear channel assessment detection range of the apparatus to decrease the degree of interference at the apparatus.

18. The apparatus of claim 10, wherein the apparatus comprises an access point.

19. A non-transitory computer-readable storage medium including computer program code which when executed by at least one processor cause operations comprising:
determining, at a node, a degree of interference at the node;
receiving, at the node, at least one message from at least one neighboring node, the at least one message including another degree of interference observed at a first neighboring node of the at least one neighboring node;
determining, at the node, a difference between the degree of interference at the node and the received another degree of interference; and
adjusting, by the node and based on the difference, at least one of a receiver sensitivity of the node and a clear channel assessment detection range of the node.

* * * * *